(12) United States Patent
Herrmann et al.

(10) Patent No.: US 12,208,574 B2
(45) Date of Patent: Jan. 28, 2025

(54) PROCESS OF PRODUCING A SURFACE-MODIFIED 3-DIMENSIONAL ARTICLE

(71) Applicant: Solventum Intellectual Properties Company, Maplewood, MN (US)

(72) Inventors: Andreas G. Herrmann, Munich (DE); Gioacchino Raia, Türkenfeld (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 177 days.

(21) Appl. No.: 17/794,324

(22) PCT Filed: Feb. 2, 2021

(86) PCT No.: PCT/IB2021/050818
§ 371 (c)(1),
(2) Date: Jul. 21, 2022

(87) PCT Pub. No.: WO2021/156737
PCT Pub. Date: Aug. 12, 2021

(65) Prior Publication Data
US 2023/0049712 A1 Feb. 16, 2023

(30) Foreign Application Priority Data
Feb. 3, 2020 (EP) .................................... 20155066

(51) Int. Cl.
*B29C 64/165* (2017.01)
*A61C 13/00* (2006.01)
(Continued)

(52) U.S. Cl.
CPC ........ *B29C 64/165* (2017.08); *A61C 13/0013* (2013.01); *A61C 13/0019* (2013.01);
(Continued)

(58) Field of Classification Search
CPC ..... B29C 64/165; B29C 64/264; B29C 64/35; B29C 64/188; B33Y 10/00
See application file for complete search history.

(56) References Cited

U.S. PATENT DOCUMENTS

| | | | |
|---|---|---|---|
| 4,527,979 A | 7/1985 | McLean et al. | |
| 4,642,126 A | 2/1987 | Zador et al. | |
| (Continued) | | | |

FOREIGN PATENT DOCUMENTS

| | | |
|---|---|---|
| CN | 101917925 B | 7/2013 |
| EP | 0115058 B1 | 1/1988 |
| (Continued) | | |

OTHER PUBLICATIONS

1507 Extended EP Search Report for EP20155066.2, PCT/IB2021/050818, dated Aug. 4, 2020, 4 pages.
(Continued)

*Primary Examiner* — Edmund H Lee

(57) ABSTRACT

A process of producing a surface-modified 3-dimensional article, the process comprising the steps of providing a radiation-curable composition, building-up a 3-dimensional article by radiation-curing the radiation-curable composition layer by layer, preferably by using a stereolithography or digital light processing unit, partially removing radiation-curable composition which sticks to the surface of the 3-dimensional article, treating only a portion of the surface of the 3-dimensional article to which the radiation-curable composition is stuck with particles, applying an additional curing step to the 3-dimensional article, preferably by applying heat and/or radiation. A 3-dimensional article which can be obtained by such a process and a kit of parts comprising such a 3-dimensional article.

11 Claims, 1 Drawing Sheet

(51) Int. Cl.

| | | |
|---|---|---|
| *A61C 13/087* | (2006.01) | |
| *B29C 64/264* | (2017.01) | |
| *B29C 64/35* | (2017.01) | |
| B29L 31/00 | (2006.01) | |
| B33Y 10/00 | (2015.01) | |
| B33Y 70/10 | (2020.01) | |
| B33Y 80/00 | (2015.01) | |

(52) U.S. Cl.
CPC ......... *A61C 13/087* (2013.01); *B29C 64/264* (2017.08); *B29C 64/35* (2017.08); B29L 2031/7536 (2013.01); B33Y 10/00 (2014.12); B33Y 70/10 (2020.01); B33Y 80/00 (2014.12)

(56) References Cited

U.S. PATENT DOCUMENTS

| | | | |
|---|---|---|---|
| 4,652,274 A | | 3/1987 | Boettcher et al. |
| 4,737,593 A | | 4/1988 | Ellrich et al. |
| 4,795,823 A | | 1/1989 | Schmitt et al. |
| 5,234,636 A | * | 8/1993 | Hull ................ B33Y 10/00 427/508 |
| 6,730,156 B1 | | 5/2004 | Windisch et al. |
| 7,393,882 B2 | | 7/2008 | Wu et al. |
| 2015/0185375 A1 | * | 7/2015 | Hannington ........... B29C 70/64 156/60 |
| 2020/0180328 A1 | * | 6/2020 | Jackson ............. B29C 64/295 |
| 2021/0023773 A1 | * | 1/2021 | Gruhlke ................ C08K 7/16 |
| 2021/0023780 A1 | * | 1/2021 | Price ..................... B33Y 80/00 |

FOREIGN PATENT DOCUMENTS

| | | |
|---|---|---|
| EP | 0235826 B1 | 4/1990 |
| EP | 2167013 B1 | 12/2010 |
| WO | 2018222395 A1 | 12/2018 |
| WO | 2018231583 A1 | 12/2018 |
| WO | 2019023120 A1 | 1/2019 |
| WO | 2019102304 A1 | 5/2019 |
| WO | 2019111208 A1 | 6/2019 |
| WO | 2019190902 A1 | 10/2019 |

OTHER PUBLICATIONS

International Search Report for PCT Application No. PCT/IB2021/050818 mailed on Apr. 12, 2021, 6 pages.

* cited by examiner

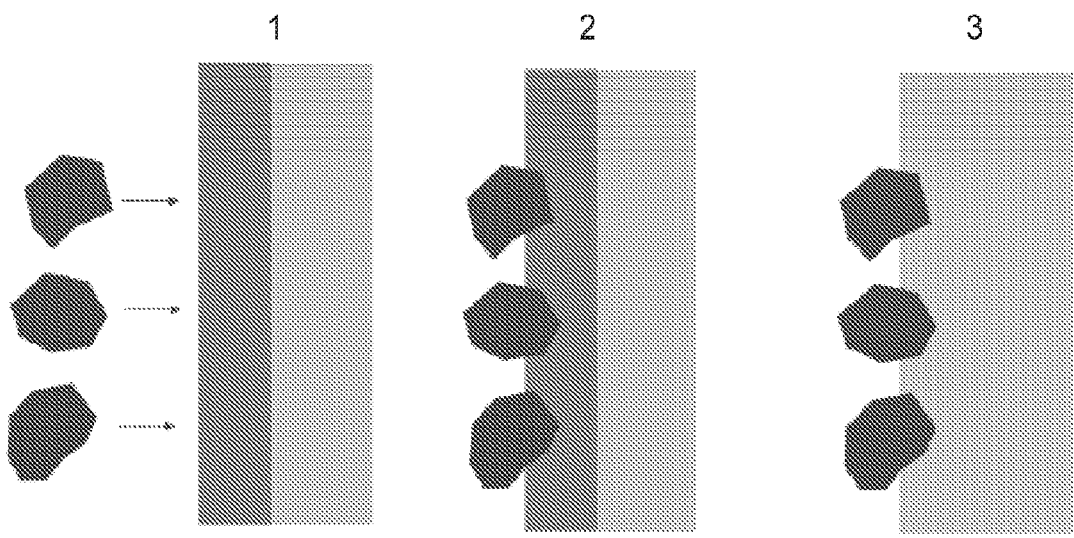

PROCESS OF PRODUCING A SURFACE-MODIFIED 3-DIMENSIONAL ARTICLE

CROSS REFERENCE TO RELATED APPLICATIONS

This application is a national stage filing under 35 U.S.C. 371 of PCT/IB2021/050818, filed 2 Feb. 2021, which claims the benefit of European Patent Application No. 20155066.2, filed 3 Feb. 2020, the disclosures of which are incorporated by reference in their entireties herein.

FIELD OF THE INVENTION

The invention relates to a process for producing a surface-modified article by additive-manufacturing, an article with a modified surface and its use thereof.

This process can be used in particular for producing dental or orthodontic restorations, which can be fixed to a tooth surface more easily.

BACKGROUND

In a variety of technical fields, physical objects or mechanical workpieces are more and more manufactured by additive manufacturing processes.

Such additive manufacturing processes typically allow for building up an object in the desired individual shape, by subsequently adding material to create that shape, e.g. by layer-wise curing of a radiation-curable composition. E.g., stereo lithography (SLA) and digital light processing (DLP) are techniques, where objects are built up layer by layer. These processes are also often referred to as "3d-printing".

After the radiation-curing process is finished, the 3d-printed article is removed from the printing vat with the result that on the surface of the obtained 3d-printed article uncured printing resin is present.

The uncured resin has to be removed afterwards. Otherwise, the desired surface accuracy cannot be obtained. The removal of uncured resin can be achieved in various ways by applying a cleaning step.

E.g. WO 2019/023120 A1 (3M) describes a method of making a physical object by additive manufacturing, wherein the method comprises the steps of a) providing a hardenable primary material, building up the object, and c) cleaning the object from excess material by moving the object and thereby generating a mass inertial force in the excess material.

WO 2018/222395 A1 (3M) describes the use of a cleaning composition for removing uncured printing resin from a 3d-printed article, wherein the cleaning composition comprises either of the following components alone or in combination: di basic esters of a carboxylic acid; tri basic esters of a carboxylic acid.

A system which can be used for washing a 3d-printed object is described in WO 2019/111208 A1 (3M). To ensure that the 3d-printed article obtained after the cleaning step is in its fully cured state and has the desired mechanical properties, typically a post-curing step is applied.

The post curing is typically done by applying radiation to the 3d-printed article e.g. by using a radiation curing unit.

Additive manufacturing processes can also be used in the dental industry for producing so-called dental composite crowns, that is, crowns which have been made by the radiation-curing of a radiation-curable composition layer-by-layer.

E.g. WO 2018/231583 A1 (3M) relates to a curable composition comprising a resin matrix, a filler matrix, and an initiator system which can be used for the 3d-printing of a dental composite crown.

The fixation or cementation of dental composite crowns is not easy and typically requires a couple of steps, including the use of an adequate dental cement.

For enhancing the retention or fixation, the inner surface of the dental composite crown is typically roughened, e.g. by sandblasting.

The roughening of the inner surface of the dental composite crown by sandblasting typically results in a mechanical retention for the dental cement. A mechanical retention, besides chemical bonding, is considered to be an important aspect for achieving a sufficient bonding strength of the dental composite crown to the tooth surface.

Thus, a higher surface roughness, a surface with a higher ability to connect chemically with the cement and/or a more robust cementation process for 3d-printed dental composite crowns are sometimes desired.

Proposed are also processes for smoothening the surface of stereolithographically produced:

U.S. Pat. No. 5,234,636 (Hull et al.) describes a method of coating stereolithographic parts and smoothing over characteristic surface discontinuities having alternating recesses and peaks by covering the stereolithographic parts with a substance capable of becoming less viscous when heated, heating the substance enabling the substance to flow into the recesses of the surface.

WO 2019/102304 A1 (3M) describes a method of making a physical object by additive manufacturing comprising the steps of providing a light hardenable primary material, building up the object, coating at least a part of the object with a flowable coating and irradiating the coated object with light.

In WO 2019/190902 A1 (Carbon Inc.) a method of making a functional coated object is described, wherein the method comprises stereolithographically producing a green intermediated object from a dual cure polymerizable resin containing uncured polymerizable material therein, coating at least one surface portion of said object with a particulate material, heating said object, said coating and/or heating steps being carried out under conditions in which uncured polymerizable material sweats or exudes to the surface of said object and wherein the uncured polymerizable material contacts said particulate material, polymerizes and bonds said particulate material to the surface of said object.

SUMMARY OF INVENTION

Generally, there is a need for a process allowing an easy surface-modification of a 3-dimensional article, in particular a 3-dimensional article which has been obtained or is obtainable by using an additive-manufacturing process.

More precisely, there is a need for a process which allows the producing of a 3-dimensional article, in particular a 3-dimensional article having the shape of a dental or orthodontic article, which can be fixed to a surface, e.g. the surface of a tooth, more easily.

Ideally, it should be possible to fix the 3-dimensional article obtained or obtainable by such a process to a surface by using a dental cement.

One or more of the above objectives are addressed by the present invention.

In one embodiment the present invention features a process of producing a surface-modified 3-dimensional article, the process comprising the steps of providing a radiation-curable composition.

building-up a 3-dimensional article by radiation-curing the radiation-curable composition layer by layer, preferably by using a stereolithography or digital light processing unit, partially removing radiation-curable composition which sticks to the surface of the 3-dimensional article, treating at least a portion of the surface of the 3-dimensional article to which the radiation-curable composition is stuck with particles, applying an additional curing step to the 3-dimensional article, preferably by applying heat and/or radiation.

In another embodiment, the invention relates to a 3-dimensional article obtained or obtainable by such a process.

A further embodiment of the invention is directed to a kit of parts comprising such a 3-dimensional article and a dental cement which can be used for the fixation of the 3-dimensional article to tooth surface.

The invention is also related to a kit of parts comprising a radiation-curable composition, particles, and an additive-manufacturing equipment, wherein the radiation-curable, the particles and the additive-manufacturing equipment are as described in the present text.

Unless defined differently, for this description the following terms shall have the given meaning:

The term "compound" or "component" is a chemical substance which has a certain molecular identity or is made of a mixture of such substances, e.g., polymeric substances.

A "hardenable or curable or polymerizable component" is any component which can be cured or solidified in the presence of a photo-initiator by radiation-induced polymerization. A hardenable component may contain only one, two, three or more polymerizable groups. Typical examples of polymerizable groups include unsaturated carbon groups, such as a vinyl group being present i.a. in a (methyl) acrylate group.

As used herein, "(meth)acryl" is a shorthand term referring to "acryl" and/or "methacryl". For example, a "(meth)acryloxy" group is a shorthand term referring to either an acryloxy group (i.e., $CH_2=CH-C(O)-O-$) and/or a methacryloxy group (i.e., $CH_2=C(CH_3)-C(O)-O-$).

As used herein, "hardening" or "curing" a composition are used interchangeably and refer to polymerization and/or crosslinking reactions including, for example, photo-polymerization reactions and chemical-polymerization techniques (e. g., ionic reactions or chemical reactions forming radicals effective to polymerize ethylenically unsaturated compounds) involving one or more materials included in the composition.

A "photo-initiator" is a substance being able to start or initiate the curing process of a hardenable composition in the presence of radiation, in particular light (wavelength of 300 to 700 nm).

"Dental article" means an article which is to be used in the dental field, especially for producing a dental restoration.

"Dental restoration" means dental articles which are used for restoring a defect tooth structure.

Examples of dental restorations include crowns, bridges, inlays, onlays, veneers, facings, copings, crown and bridged framework, implants, abutments, monolithic dental restorations and parts thereof.

A dental article should not contain components which are detrimental to the patient's health and thus free of hazardous and toxic components being able to migrate out of the dental or orthodontic article.

"Additive manufacturing" or "3d-printing" means processes comprising a layer-wise creation of an object from digital data. The articles can be of almost any shape or geometry and are produced from a 3-dimensional model or other electronic data source. For the purpose of the present specification the term "additive manufacturing" is understood to mean "3d-printing".

Many 3d-printing technologies exist, one of them being vat polymerization which uses a radiation curing step to make 3-dimensional articles.

Examples of vat polymerization techniques include stereolithography (SLA) and digital light processing (DLP).

"Stereolithography" is an example of an additive manufacturing technique where typically two motors are used for aiming a laser beam across the print area thereby solidifying the printing resin. This process breaks down the design, layer by layer, into a series of points.

Stereolithography generally uses light for hardening radiation curable resins. Data based on computer aided design and/or computer aided manufacturing (CAD/CAM) are used to project a light pattern on a layer of the radiation curable resin. The radiation sensitive resin typically solidifies in consequence of the exposure of the light so that a layer of solidified resin according to the pattern is formed. A three-dimensional object is created by consecutively adding layers. Thereby the pattern is controlled according to the desired outer shape of the three-dimensional object.

"Digital light processing" is another example of an additive manufacturing technique and typically comprises the use of a digital projector screen to flash an image of each layer across the building platform of the additive manufacturing unit. The image is typically composed of square pixels, resulting in a layer formed from small rectangular bricks called voxels.

Typically, the layers have a particular thickness in the build axis. The build axis typically extends in a dimension along which the layers are stacked onto each other. In dimensions perpendicular to the build axis each layer typically has a shape that is derived from an overall three-dimensional shape of the object. Typically, the layers are obtained from virtually slicing a three-dimensional computer model of the object into a multiplicity of virtual layers. The virtual layers are then used to build up physical layers that correspond to the virtual layers in thickness and shape.

The wording "light appropriate to cause the radiation curable material to harden" preferably refers to light within the wavelength of 450 nm to 495 nm (blue light) or light within the wavelength of 330 nm and 445 nm, preferably 383 nm (UV-light). The light used for the method described in the present text can be selected in accordance to the radiation curable material used for building up the object.

"Glass ionomer cement" means a dental cement which cures by the reaction of an acid-reactive glass and a polyacid, typically in the presence of a retarder and water. Glass ionomer cements typically contain the following components: acid-reactive filler, polyacid, water, and complexing agent, but no radiation-curable components.

"Resin modified glass ionomer cement" means a hardenable dental material comprising acid-reactive glass, polyacid, water, polymerizable components and initiator. Resin modified glass ionomer cements undergo a twofold curing reaction, a glass ionomer acid-base based cement reaction and a polymerization of typically (meth)acrylate based monomers.

"Adhesive resin cement" means a hardenable dental material which cures by radical polymerization of polymerizable components (but not by a glass ionomer cement reaction). An adhesive resin cement requires a pre-treatment of the hard dental surfaces to effect adhesion. In contrast to resin modified glass ionomer cements, an adhesive resin cement does not contain added water.

A "self-adhesive resin cement" is an adhesive resin cement which in addition contains acidic components and thus does not require a pre-treatment of the hard dental surfaces to effect adhesion. In contrast to resin modified glass ionomer cements, adhesive resin cements and self-adhesive resin cements typically only cure by polymerization reaction.

"Temporary cement" means a cement composition which is based on a curing reaction of a zinc component (e.g. ZnO) with a phosphate, polycarboxylate or eugenol component. The respective cements are known as zinc phosphate cement, zinc oxide eugenol cement, zinc polycarboxylate cement.

"Glass" means an inorganic non-metallic amorphous material which is thermodynamically an under-cooled and frozen melt. Glass refers to a hard, brittle, transparent solid. Typical examples include soda-lime glass and borosilicate glass. A glass is an inorganic product of fusion which has been cooled to a rigid condition without crystallizing. Most glasses contain silica as their main component and a certain amount of glass former.

A "particle" means a substance being a solid having a shape which can be geometrically determined. The shape can be regular or irregular. Particles can typically be analysed with respect to e.g. particle size and particle size distribution.

The mean particle size of a powder can be obtained from the cumulative curve of the grain size distribution and is defined as the arithmetic average of the measured grain sizes of a certain powder mixture. Respective measurements can be done using commercially available granulometers (e.g. CILAS Laser Diffraction Particle Size Analysis Instrument).

"Ambient conditions" mean the conditions which the composition described in the present text is usually subjected to during storage and handling. Ambient conditions may, for example, be a pressure of 900 to 1,100 mbar, a temperature of 10 to 40° C., and a relative humidity of 10 to 100%. In the laboratory ambient conditions are typically adjusted to 20 to 25° C., and 1,000 to 1025 mbar (at maritime level).

A composition is "essentially or substantially free of" a certain component, if the composition does not contain said component as an essential feature. Thus, said component is not wilfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The terms "comprise" or "contain" and variations thereof do not have a limiting meaning where these terms appear in the description and claims. "Consisting essentially of" means that specific further components can be present, namely those which do not materially affect the essential characteristic of the article or composition. "Consisting of" means that no further components should be present. The term "comprise" shall include also the terms "consist essentially of" and "consists of".

BRIEF DESCRIPTION OF FIGURES

FIG. 1 shows a schematic view of the process steps according to the invention.

DETAILED DESCRIPTION OF THE INVENTION

It has been found that the process described in the present text has a couple of advantageous properties.

The process described in the present text allows an easy surface-modification of a 3d-printed article obtained or obtainable by additive-manufacturing techniques involving the radiation-curing of a radiation-curable composition layer-by-layer.

After curing the radiation-curable composition layer-by-layer and removing the obtained 3d-printed article from the remaining radiation-curable composition, a thin non-cured layer of radiation-curable composition is still present on the surface of the 3-dimensional article.

This layer of radiation-curable composition can be used for a surface-modification step involving the step of treating with, modifying with or embedding particles into this layer, at least partially.

The particles are embedded into this layer before the final curing step is done.

Not all particles will be fully embedded, a portion of these particles will be embedded only partially. This results in an increase of the surface roughness.

In addition, the surface of the 3d-printed article is modified in that the surface now contains additional particles, which typically have physical and/or chemical properties being different from the material the 3d-printed article is made of.

Thus, by selecting the particles and the treatment conditions, the surface roughness and/or the surface properties of the 3d-printed article can easily be modified.

E.g, by using a so-called "spin-cleaning process" as described in the present text as one possible embodiment for cleaning the surface of a 3d-printed article, the thickness of the layer of the non-cured radiation-curable composition can be easily adjusted.

A higher surface roughness is often considered to be advantageous as more retention elements are available on the surface.

This typically allows for a better and more robust adhesion when the 3d-printed article is adhesively fixed to a surface by using an adequate adhesive composition or cement.

The final curing of the 3d-printed article afterwards results to 3d-printed article having a surface with particles incorporated and fixed therein.

An additional roughening step of the surface of the 3-dimensional article will not be required anymore.

The process described in the present text cannot only be used for producing 3d-printed articles on an industrial scale but also for producing individualized single 3d-printed articles, e.g. for producing 3d-printed dental composite crowns chairside or in a dental lab.

As the particles are typically only partly embedded into the surface, the remaining portion of the particles is available for a further interaction with a different medium. e.g. an adhesive composition or cement.

Depending on the particles used, the process described in the present text allows the surface-modification of the surface of the 3d-printed article in a variety of aspects.

For example, particles can be used which can chemically interact with components being present in the composition or cement which is used for fixing the 3d-printed article to a surface.

This opens the opportunity to use a variety of different adhesive compositions or cements for the fixing of the 3d-printed article to a surface, including the surface of a tooth, including the use of glass-ionomer cements.

It is also possible to use particles which help to improve or modify the mechanical properties of the 3d-printed article.

This is a breakthrough in the dental area, since so far, dental composite crowns could not be cemented with e.g. a glass-ionomer-cement at all.

The option to have a process at hand which enables the practitioner to use a glass ionomer cement for the fixing of a 3d-printed dental composite crown to the surface of a tooth is advantageous for a variety of reasons.

Glass ionomer cements are typically cheaper than self-adhesive resin cements. Further, they are typically more moisture tolerant, and can be applied more easily.

The invention relates to a process of producing a surface-modified 3-dimensional, in particular a 3d-printed article.

This process comprises a couple of steps. Typically, a radiation-curable composition is provided first.

The properties and chemical composition of the radiation-curable composition are not particularly limited unless the radiation-curable composition is not suitable for the intended use.

The radiation-curable composition can typically be characterized by the following features alone or in combination:
curable by radiation having a wavelength in the range of 350 to 600 nm or 350 to 420 nm;
viscosity: 1 to 400 Pa*s or 5 to 200 Pa*s or 5 to 100 Pa*s at 23° C., at a shear rate of 1 s$^{-1}$;
pH value: 5 to 9 or 6 to 8, if brought in contact with wet pH sensitive paper.

If desired, the properties can be measured as described in the example section.

In certain embodiments, the combination of the following features is sometimes desirable: a) and b), or a), b) and c).

In certain embodiments, using a radiation-curable composition with the following properties is sometimes preferred:
curable by radiation having a wavelength in the range of 350 to 420 nm;
viscosity: 5 to 100 Pa*s at 23° C., at a shear rate of 1 s$^{-1}$;
pH value: 6 to 8, if brought in contact with wet pH sensitive paper.

The curable composition described in the present text is radiation curable within a wavelength range which is typically used by commercially available additive manufacturing equipment.

Further, the curable composition described in the present text typically has a viscosity which allows the processing of the composition in an SLA or DLP process. A lower viscosity is sometimes preferred, as it may allow for a better printing quality, in particular as regards surface accuracy.

As the curable composition does typically not contain acidic components, the pH value of the composition is in the neutral range.

The resin material used for the additive-manufacturing process typically comprises (meth)acrylate components and a photo-initiator suitable for initiating the curing reaction of the radiation-curable components.

It can be advantageous, if the radiation-curable composition comprises radiation-curable (meth)acrylate components comprising at least one urethan moiety.

The molecular weight of the (meth)acrylate(s) is typically at least 170 or at least 200 or at least 300 g/mol. The molecular weight (Mw) of the (meth)acrylate(s) is typically in a range of 170 to 3,000 g/mol or 200 to 2.500 g/mol or 300 to 2,000 g/mol.

The (meth)acrylate(s) has free radically active functional groups and includes monomers, oligomers, and polymers having two or more ethylenically unsaturated groups.

Such free radically polymerizable materials include di- or poly-acrylates and methacrylates such glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane; the bis-acrylates and bis-methacrylates of polyethylene glycols of molecular weight 200-500, copolymerizable mixtures of acrylated monomers such as those in U.S. Pat. No. 4,652,274, and acrylated oligomers such as those of U.S. Pat. No. 4,642,126, and vinyl compounds such as diallyl phthalate, divinyl succinate, divinyl adipate and divinylphthalate.

Preferred ethylenically unsaturated monomers are methacrylate and acrylate monomers, such as di(meth)acrylates of propanediol, butanediol, hexanediol, octanediol, nonanediol, decanediol and eicosanediol, di(meth)acrylates of ethylene glycol, of polyethylene glycols and of polypropylene glycols, di(meth)acrylates of ethoxylated bisphenol A, for example 2,2'-bis(4-(meth)acryl-oxytetraethoxyphenyl) propanes, and (meth)acrylamides. The monomers used can furthermore be esters of [alpha]-cyanoacrylic acid, crotonic acid, cinnamic acid and sorbic acid.

It is also possible to use the (meth)acrylic esters, such as bis[3[4]-methacryl-oxymethyl-8(9)-tricyclo[5.2.1.0$^{2,6}$] decylmethyl triglycolate. Particularly suitable are 2,2-bis-4 (3-methacryloxy-2-hydroxypropoxy)pheny lpropane (Bis-GMA), 2,2-bis-4 (3-methacryloxypropoxy)phenylpropane, triethylene glycol dimethacrylate (TEGDMA), and di(meth) acrylates of bishydroxymethyltricyclo-(5.2.1.0$^{2,6}$) decane. Suitable methacrylate esters are also described in in EP 0 235 826 A1 (ESPE).

It was found that using (meth)acrylate(s) and more particularly, the components described above, can be beneficial to provide the hardened composition with sufficient mechanical strength as it may function as a kind of cross-linking agent useful for improving the mechanical properties of the cured dental composition.

If present, the (meth)acrylate component is typically present in the following amounts:
lower amount: at least 40 or at least 45 or at least 50 wt. %;
upper amount: utmost 85 or utmost 80 or utmost 70 wt. %;
range: 40 to 85 or 45 to 80 or 50 to 70 wt. %;

wt. % with respect to the weight of the radiation-curable composition.

The radiation-curable composition described in the present text typically also comprises an initiator system, in particular a photo-initiator system.

The initiator system is typically present in an amount of 0.1 to 5 or 0.2 to 4 or 0.5 to 3 wt. %.

The initiator system typically comprises a photo-initiator and an organic dye.

The initiator system contributes to an efficient cure of the curable composition, controls light penetration and light scattering and thus may have an impact on mechanical and aesthetic properties.

The photo-initiator should be able to start or initiate the curing or hardening reaction of the radiation-curable component(s) being present in the radiation-curable composition.

The photo-initiator typically shows a light absorption band in a wavelength range of 300 to 450 nm, preferably in the range of 350 to 420 nm.

Suitable examples of photo-initiators typically contain a phosphine oxide moiety.

Examples of light curing initiator components include the class of acylphosphine oxides, as described in e.g. in U.S. Pat. No. 4,737,593 (Elrich et al.)

Such acylphosphine oxides are of the general formula

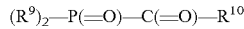

wherein each $R^9$ individually can be a hydrocarbyl group such as alkyl, cycloalkyl, aryl, and aralkyl, any of which can be substituted with a halo-, alkyl- or alkoxy-group, or the two $R^9$ groups can be joined to form a ring along with the phosphorous atom, and wherein $R^{10}$ is a hydrocarbyl group, an S—, O—, or N-containing five- or six-membered heterocyclic group, or a —Z—C(=O)—P(=O)—$(R^9)_2$ group, wherein Z represents a divalent hydrocarbyl group such as alkylene or phenylene having from 2 to 6 carbon atoms.

Preferred acylphosphine oxides are those in which the $R^9$ and $R^{10}$ groups are phenyl or lower alkyl- or lower alkoxy-substituted phenyl. By "lower alkyl" and "lower alkoxy" is meant such groups having from 1 to 4 carbon atoms.

Tertiary amine reducing agents may be used in combination with an acylphosphine oxide. Illustrative tertiary amines include ethyl 4-(N,N-dimethylamino) benzoate and N,N-dimethylaminoethyl methacrylate.

Commercially-available phosphine oxide photo-initiators capable of free-radical initiation when irradiated at wavelengths of greater than 400 nm to 1,200 nm include a 25:75 mixture, by weight, of bis(2,6-dimethoxybenzoyl)-2,4,4-trimethylpentyl phosphine oxide and 2-hydroxy-2-methyl-1-phenylpropan-1-one (previously known as IRGACURE™ 1700, Ciba Specialty Chemicals), 2-benzyl-2-(N,N-dimethylamino)-1-(4-morpholinophenyl)-1-butanone (previously known as IRGACURE™ 369, Ciba Specialty Chemicals), bis(η5-2,4-cyclopentadien-1-yl)-bis(2,6-difluoro-3-(1H-pyrrol-1-yl) phenyl) titanium (previously known as IRGACURE™ 784 DC, Ciba Specialty Chemicals), a 1:1 mixture, by weight, of bis(2,4,6-trimethylbenzoyl)pheny l phosphine oxide and 2-hydroxy-2-methyl-1-phenylpropane-1-one (previously known as DAROCUR™ 4265, Ciba Specialty Chemicals), and ethyl-2,4,6-trimethylbenzylphenyl phosphinate (LUCIRIN™ LR8893X, BASF Corp., Charlotte, NC), 2,4,6-trimethylbenzoyldiphenyl-phospine oxide (LUCIRIN™ TPO).

Exemplary UV initiators include 1-hydroxycyclohexyl benzophenone (previously known as "IRGACURE 184" from Ciba Specialty Chemicals Corp., Tarrytown, NY), 4-(2-hydroxyethoxy)phenyl-(2-hydroxy-2-propyl) ketone (previously known as "IRGACURE 2529" from Ciba Specialty Chemicals Corp.), 2-hydroxy-2-methylpropiophenone (previously known as "DAROCURE D111" from Ciba Specialty Chemicals Corp, and bis(2,4,6-trimethylbenzoyl)-phenylposphineoxide (previously known as "IRGACURE 819" from Ciba Specialty Chemicals Corp.). The most preferred acylphosphine oxide is bis(2,4,6-trimethylbenzoyl)pheny 1 phosphine oxide (OMNIRAD™ 819, IGM Resin B.V., Waalwijk, NL).

The photo-initiator(s) is typically present in the following amounts:
  Lower amount: at least 0.01 or at least 0.05 or at least 0.1 wt. %;
  Upper amount: at most 3 or at most 2 or at most 1.5 wt. %;
  Range: 0.01 to 3 or 0.05 to 2 wt. % or 0.1 to 1.5 wt. %; wt. % with respect to the weight of the radiation-curable composition.

The polymerizable composition described in the present text typically also comprises one or more organic dye(s).

The nature and structure of the organic dye(s) is not particularly limited unless the desired result cannot be achieved.

It was found that by adding an organic dye, the ability of the polymerizable composition described in the present text to absorb radiation can be enhanced.

In addition, it was found that adding an organic dye contributes to supress or to lower the transmission of scattered light in the polymerizable composition. This often helps to improve the accuracy or detail resolution of the surface of the 3-dimensional article obtained from the additive manufacturing process.

In certain embodiments, the organic dye(s) can be characterized by at least one, more, of all of the following parameters:
  a) having a light absorption band within a wavelength range of 350 to 420 nm;
  b) not having a light absorption band in the wavelength range of 400 to 800 nm;
  c) comprising a terephthalate moiety.

The combination of parameters a) and b) is sometimes preferred.

Organic dyes which can be used include those containing a moiety selected form terephthalate groups and/or aromatic (hetero) cycles or other systems with delocalized pi-electrons. In particular dyes useful for colouring food were found to be useful.

Dye(s) which can be used include Lumilux™ Blue, Lumilux™ Yellow (Honeywell) and mixtures thereof.

If present, the organic dye(s) is present in the following amounts:
  Lower amount: at least 0.001 or at least 0.002 or at least 0.005 wt. %;
  Upper amount: at most 0.5 or at most 0.2 or at most 0.1 wt. %;
  Range: 0.001 to 0.5 or 0.002 to 0.2 or 0.005 to 0.1 wt. %; wt. % with respect to the weight of the radiation-curable composition.

The radiation-curable composition described in the present text typically comprises a filler matrix.

The filler matrix is typically present in the radiation-curable composition in an amount of 5 to 45 wt. % or 10 to 40 wt. %.

The amount of filler used may have an impact on the viscosity of the radiation-curable composition, and the abrasion resistance of the cured composition or both.

The filler matrix may comprise fumed silica.

The specific surface (BET) of the fumed silica is typically in the range of 100 to 300 m$^2$/g or from 150 to 250 m$^2$/g.

A mixture of different fumed silica can be used, if desired.

E.g, a mixture of fumed silica the surface of which has been treated with a hydrophobic surface treating agent and fumed silica the surface of which has been treated with a hydrophilic surface treating agent can be used.

Suitable hydrophobic surface-treating agents include: —OSiR$_3$, with R being selected from C$_{1-4}$ alkyl, preferably methyl and mixtures thereof.

Hydrophobic fumed silica is also commercially available under the trade designations HDK, in particular HDK-H™ 2000 (Wacker), or Aerosil™ R812 (Evonik).

It was found that using fumed silica the surface of which has been treated with surface treating agents containing polymerizable moieties, like (meth)acrylsilanes, may sometimes lead to a non-desired thickening of the curable composition, which may make the curable composition less suitable as processing material in an additive manufacturing process.

Thus, according to one embodiment the curable composition described in the present text does typically not contain fumed silica having been surface treated with surface treating agents containing polymerizable moieties like (meth)acrylsilanes, in an amount of more than 2 wt. % or more than 1.5 wt. % or more than 1 wt. % with respect to the weight of the radiation-curable composition.

If present, fumed silica is typically present in either of the following amounts:
  Lower amount: at least 0.5 or at least 1 or at least 1.5 wt. %;
  Higher amount: utmost 8 or utmost 7 or utmost 5 wt. %;
  Range: 0.5 to 8 or 1 to 7 or 1.5 to 5 wt. %;
  wt. % with respect to the weight of the radiation-curable composition.

The filler matrix may also comprise nanocluster(s).

One or more different kinds of nanocluster(s) can be present.

It was found that compared to other fillers, using nanocluster(s) can be beneficial because it allows the formulation of a composition with high filler load resulting typically in better mechanical properties, e.g. polishability or abrasion and in higher aesthetics.

The nanocluster can typically be characterized by at least one or all of the following features:
  specific surface (BET): 30 to 400 or 60 to 300 or 80 to 250 m$^2$/g,
  comprising particles of SiO$_2$, ZrO$_2$, Al$_2$O; and mixtures thereof.

If desired, the specific surface can be determined according to Brunauer, Emmet and Teller (BET) by using a device (Monosorb™) available from Quantachrome.

A suitable nano-filler comprising aggregated nano-sized particles can be produced according to the processes described e.g. in U.S. Pat. No. 6,730,156 (preparatory example A).

A useful nano-filler comprising aggregated nano-sized particles can be prepared from a suitable sol and one or more oxygen containing heavy metal compound solution(s) precursors which may be salts, sols, solutions, or nano-sized particles; of these, sols are preferred.

If desired, the surface of the filler particles can be surface treated. The surface-treatment can be accomplished according to a process as described in U.S. Pat. No. 6,730,156 (Windisch et al.) or U.S. Pat. No. 6,730,156 (Wu et al.). The content of these references is herewith incorporated by reference.

Once dispersed in the resin, the filler remains in an aggregated stage. That is, during the dispersion step the particles do not break up into discrete (i.e. individual) and un-associated (i.e. non-aggregated) particles.

If present, the nanocluster(s) is typically present in either of the following amounts:
  Lower amount: at least 5 or at least 10 or at least 15 wt. %;
  Higher amount: utmost 40 or utmost 38 or utmost 35 wt. %;
  Range: 5 to 40 or 10 to 38 or 15 to 35 wt. %;
  wt. % with respect to the weight of the radiation-curable composition.

The radiation-curable composition can be obtained by mixing the respective components, preferably under save-light conditions.

A typical radiation-curable composition may comprise the following components: (meth)acrylate component(s): 40 to 85 wt. %,
  Photo-initiator(s): 0.01 to 3 wt. %,
  Filler(s): 5 to 45 wt. %,
  Organic dye(s): 0.001 to 0.5 wt. %,
  wt. % with respect to the weight of the radiation-curable composition.

A suitable radiation-curable resin material may also be characterized by comprising
  a resin matrix comprising
    polymerizable (meth)acrylate(s) not comprising a urethane moiety,
    polymerizable urethane (meth)acrylate(s),
    wherein the polymerizable (meth)acrylate(s) not comprising an urethane moiety are used in excess over the polymerizable urethane (meth)acrylate(s),
  a filler matrix comprising
    nanocluster(s),
    optionally fumed silica in an amount below 8 wt. %,
    the filler matrix being typically present in an amount of 5 to 45 wt. %,
  an initiator system comprising
    photo-initiator(s),
    organic dye(s),
  the radiation-curable composition having a viscosity of 100 Pa*s or below at 23° C., and a shear rate of 1s$^{-1}$.

Suitable radiation-curable resin materials are also described WO 2018/231583 A1 (3M). The content of this references is herewith incorporated by reference.

Suitable radiation-curable compositions are also commercially available, e.g. SHERAprint™-cast or SHERAprint™-model or Prodways PLASTCure™ Cast 200 or Prodways PLASTCure™ Model 300.

The inventive process further comprises the step of building-up a 3-dimensional article by radiation-curing the radiation-curable composition layer by layer.

Building-up a 3-dimensional article by additive manufacturing layer by layer is meanwhile a well-known technology. This technology is also often referred to as stereolithography or digital light processing.

According to one embodiment, the additive manufacturing process comprises the steps of
providing a layer of a radiation-curable composition on a surface,
radiation curing those parts of the layer of radiation-curable composition which will belong to the 3-dimensional article to be produced,
providing an additional layer of the radiation-curable composition in contact with the radiation cured surface of the previous layer,
repeating the previous steps until a 3-dimensional article is obtained.

Such a process comprises the step of applying radiation to the surface of a radiation-curable material, wherein the radiation is applied only to those parts of the surface which will later form a part of the article to be produced.

Radiation can be applied by using e.g. a laser beam or by mask-image projection. Using a mask-image projection based stereolithography process (MIP-SL) is sometimes preferred, as it allows a more rapid manufacturing of the article.

A MIP-SL process can be described as follows:
i. A 3-dimensional digital model of the article to be produced is provided.
ii. The 3-dimensional digital model is sliced by a set of horizontal planes.
iii. Each thin slice is converted into a two-dimensional mask image.
iv. The mask image is then projected with the aid of a radiation source onto the surface of the radiation-curable material being located in a building platform (e.g. having the shape of a vat).
V. The radiation-curable material is only cured in those regions which are exposed.
vi. The building platform containing the radiation-curable material or the layer of cured material is moved relative to the radiation source, wherein a new layer of radiation-curable material is provided being in contact with the layer of the cured material produced in the previous step.
vii. Steps (iv) to (vi) are repeated until the desired article is formed.

Projecting the mask image on the radiation-curable material can be done either top-down or bottom-up with respect to the orientation of the vat.

Using the bottom-up technique can be beneficial as less radiation curable material is needed.

In this process, the radiation-cured layer is formed on the bottom of the vat, which is transparent.

It was found that the radiation-curable composition described in the present text is in particular useful for processing it in a mask-image projection stereolithography process using the bottom-up projection technique.

Suitable process parameters for an SLA process include: Wavelength of radiation: 350 to 420 nm; Curing time: 0.5 to 20 sec.: Layer thickness: 1 to 100 μm.

Technical equipment which can be used is commercially available e.g. from 3Shape, Rapid Shape, Formlabs, Lithoz, Prodways, Stratasys, EnvisionTec and others.

The additive-manufacturing device works with a certain radiation wavelength, which is typically in the range of 350 to 420 nm. The additive-manufacturing device can also be characterized by the resolution which can be achieved. A suitable resolution is typically in the range of 5 to 100 μm or 10 to 80 μm or 20 to 60 μm.

The process described in the present text further comprises the step of partially removing radiation-curable composition which sticks or is adhered to the surface of the 3-dimensional article.

During the additive build-up process, the 3-dimensional article is built layer-by-layer, while the 3-dimensional article is still in contact with the radiation-curable composition from which the 3-dimensional article is made.

This has the consequence that a portion of the radiation-curable composition, which has not been cured, remains on the surface of the 3-dimensional article.

Before further use, the remaining radiation-curable composition is typically completely removed to ensure a better surface quality and accuracy of the desired 3-dimensional article.

However, it has been found that a partial removal can be beneficial as the radiation-curable composition which still remains on the surface of the 3-dimensional article can be used for further modification of the surface of the 3-dimensional article, e.g. by absorbing or fixing additional particles on the surface of the 3-dimensional article to obtain a surface-modified 3-dimensional article.

Thus, after the partial removal of the radiation-curable composition, still some radiation-curable composition remains on the surface of the 3-dimensional article. This remaining radiation-curable composition forms a layer on the surface.

The amount of remaining radiation-curable composition typically depends on the structure and shape of the 3-dimensional article and also the viscosity of the radiation-curable composition used for building the article.

E.g. for a 3-dimensional article having the shape of a cuboid (25 mm×10 mm×5 mm), the amount of the remaining radiation-curable composition having a viscosity in the range of 5 to 100 Pa*s (23° C., and a shear rate of 1 $s^{-1}$) is typically in the range of 0.05 to 20 wt. % or 0.1 to 10 wt. % or 0.2 to 5 wt. %.

The thickness of the layer formed by the remaining radiation-curable composition is typically in the range of 1 to 500 μm or 5 to 200 μm or 10 to 100 μm.

For the removing or partially removing of the radiation-curable composition different techniques can be used.

One technique which can be used includes the step of moving or rotating the 3-dimensional article. By doing this a mass inertial force is generated.

The term "mass inertial force" as referred to herein may be specified as force per unit mass and therefore may be specified in the unit $m/s^2$. Further, the mass inertial force can be expressed by the G-force which is a factor of the acceleration of gravity. For the purpose of the present text the acceleration of gravity is 9.81 $m/s^2$. Consequently, for example a mass inertial force of 9.81 $m/s^2$ can be expressed as 1 G.

The acceleration force or mass inertial force is induced by moving, for example rotating, the object.

The centrifugal force on a particle on the surface of the 3-dim article typically depends on the rotation speed and the radius at which that particle is located from the rotation axis.

By varying parameters such as speed of movement or rotation, the duration thereof and/or the rotation axis, this technique allows the adjustment of the amount and layer-thickness of the radiation-curable composition remaining on the surface of the 3-dimensional article.

In an embodiment the mass inertial force generated in step (c) corresponds to a G-force of at least 100 G. A mass inertial force of 100 G has proven to be suitable to remove a mid to high viscos radiation-curable material. The skilled person will recognize that the mass inertial force required for the cleaning step (c) may be lower for lower viscos materials and higher for higher viscos materials.

The following parameters were found to be useful:

| rotation speed [rpm*] | rotation speed [1/s] | radius [mm] | mass inertial force [m/s²] | G |
|---|---|---|---|---|
| 6,000 | 100 | 15 | 5,922 | 604 |
| 6,000 | 100 | 7.5 | 2,961 | 302 |
| 4,000 | 66.7 | 20 | 3,509 | 358 |
| 4,000 | 66.7 | 7.5 | 1,316 | 134 |
| 1,000 | 16.7 | 95 | 1,042 | 106 |

*rpm = rounds per minute

Such a process or technique is described e.g. in WO 2019/023120 A1 (3M). The content of this reference is herewith incorporated by reference.

Another technique which can be used includes the treating of the 3-dimensional article with a cleaning composition.

Depending on the amount of cleaning composition used and the treating time, the amount and layer-thickness of the radiation-curable composition remaining on the surface can be adjusted.

Suitable cleaning compositions contain alcohols such as ethanol or iso-propanol.

Particularly useful is also a cleaning composition comprising either of the following components alone or in combination: di basic esters of a carboxylic acid and/or tri basic esters of a carboxylic acid.

Particularly suitable is a cleaning composition comprising a di-basic ester of a carboxylic acid in an amount of 25 to 100 wt. %, a tri-basic ester of a carboxylic acid in an amount of 1 to 25 wt. %, and solvent(s) having a boiling point above 100° C. in an amount of 1 to 75 wt. %.

Such a cleaning composition is described in WO 2018/222395 A1 (3M). The content of this reference is herewith incorporated by reference.

If desired, the cleaning composition can be used in combination with a cleaning apparatus, e.g. an apparatus as described in WO 2019/111208 A1 (3M). The content of this reference is herewith incorporated by reference.

The radiation-curable composition can also simply be removed by using gravity.

The 3-dimensional article containing radiation-curable composition on its surface is simply stored or placed in a manner allowing the radiation-curable composition to drop or flow from the surface due to its own weight.

Alternatively, or in addition, a gas stream (e.g. air, or nitrogen) can be applied or used to partially remove the radiation-curable composition.

The process described in the present text further comprises the step of treating at least a portion or only a portion of the surface of the 3-dimensional article to which radiation-curable composition is stuck with particles.

That is, there is no need to treat the complete surface of the 3-dimensional article. It can already be sufficient, if only a portion of the surface of the 3-dimensional article is treated with particles. However, if desired, it is also possible to treat the complete surface of the 3-dimensional article.

A suitable portion or part of the surface of the 3-dimensional article to be treated is typically in a range of 10 to 80% or 20 to 70% or 30 to 60%.

The treating step with the particles may be adjusted to achieve e.g. a surface roughness of the 3-dimensional article in the range of 1 to 20 μm (Ra) or 2 to 10 μm (Ra).

A surface roughness in this range can be beneficial to facilitate the bonding or adhesion of other materials or compositions to the surface of the 3-dimensional article.

The adjusting of the treating step typically involves the selection of suitable particles with a desired particle size and parameters suitable for processing these particles (e.g. application pressure, duration, particle flow rate). A pre-selection of suitable parameters is often already provided by the device used for the surface roughening process.

The particles can be applied to the layer of radiation-curable composition located on the surface of the 3-dimensional article in various means.

A suitable means is the use of a gas stream. Such a treating step can be regarded as a kind of sandblasting or powder jetting.

Devices which can be used for applying particles under pressure to a surface are commercially available, e.g. Rocatec™ (3M Oral Care), Basic classic (Renfert), Airflow™ (EMS).

If the particles are applied with a gas stream, a suitable working pressure is typically in the range of 0.5 to 500 kPa (5 bar) or 1 to 300 kPa.

A suitable flow rate for the particles is typically in a range of 0.01 to 10 g/s or 0.02 to 6 g/s (e.g. for a working pressure of 2 bar).

If applied with a gas stream, the particles are typically applied for a time sufficient to achieve the desired surface roughness.

A time period in the range of 0.1 to 10 s or 1 to 5 s or 1 to 2 s per cm² surface area to be treated is considered sufficient.

Alternatively, the sandblasting or powder-jetting device may be vibrated during the treatment step to avoid an undesired caking of the particles used for the particle treatment.

The particles can also be applied by other means, e.g. by a coating process.

In such a process, the particles are typically applied without using a gas stream, but by using coating equipment such as a powder dosing unit in combination with a roller, if desired.

E.g., the coating process can be done by slightly pressing the not-fully cured surface of the 3-dimensional article into the particles.

In contrast to the process described in the present text, the sandblasting of the surface of a cleaned and fully cured 3-dimensional article for the purpose of surface-roughening will not result in the incorporation or embedding of particles into the surface of the 3-dimensional article.

The presence of the particles in the surface of the 3-dimensional article can be determined by various techniques, e.g. by microscopy or XRF analysis.

According to a further embodiment, the particles are simply placed on the surface of the 3-dimensional article to be treated, e.g. by sprinkling or pouring.

If the 3-dimensional article has e.g. a concave surface region (e.g. inner side of a dental crown), the concave region may be filled with the particles in a first step. In a further step, the 3-dimensional article is turned around so that the particles, which did not adhere to the radiation-curable composition located on the surface, simply fall down.

The properties and chemical composition of the particles to be used for the treating step are not particularly limited, unless the particles are not suitable for the intended use.

Suitable particles can be characterized by the following features alone or in combination:

average particle size: 1 to 150 µm;
density: 2 to 6 g/cm³.
Particles with the following features can also be used:
average particle size: 1 to 50 µm;
density: 2 to 6 g/cm³.

A particle size in the above range is often beneficial as larger particles can typically be embedded in the radiation-curable composition more easily.

Further, the handling and processing of particles having a larger particle size is often less complicated.

It can also be preferred, if the size of the particles used for the treatment process is larger than the thickness of the layer of the radiation-curable composition on the surface of the 3-dimensional article. In such a case it can be easily ensured that the particles are only partially embedded in the layer of the radiation-curable composition. The non-embedded part of the particles then protrudes from the surface and is accessible to the surroundings.

Using particles with a particle size being larger than the resolution of the additive-manufacturing device used for building-up the 3-dimensional article can also be beneficial.

For 3-dimensional article with thin layers of remaining radiation-curable composition on its surface it can be ensured that the roughness of the surface of the 3-dimensional article is higher the roughness caused by the resolution which can be achieved with the additive-manufacturing device.

Depending on the nature and/or chemical composition of the particles, the particles may be used as a connector or reaction partner for other compositions which are applied to the surface of the 3-dimensional article later.

Using particles with a density in the above range is also considered beneficial as the processing of such particles is typically easier. E.g., if these particles are processed with a sandblasting device, there will be a larger impulse or momentum. Particles with a density above 2 g/cm³ are often composed of inorganic components.

Particles which can be used include glass powder, metal oxide or hydroxide powder, and mixtures thereof.

Glass powder include e.g. so-called acid-reactive glasses which are commonly used for producing glass ionomer cement compositions.

Acid-reactive glasses are known in the art and are also commercially available, e.g. from Schott.

Using acid-reactive glasses can be beneficial, if it is intended to adhesively fix the 3-dimensional article to a surface (e.g. tooth surface) with a dental cement, in particular a glass ionomer cement.

Typical acid-reactive glasses include aluminosilicate glasses and in particular, fluoro alumina-silicate ("FAS") glasses. FAS glasses are sometimes preferred.

The glass can be made from a melt containing fluoride, silica, alumina, and other glass-forming ingredients using techniques familiar to those skilled in the FAS glassmaking art.

Suitable FAS glasses are familiar to those skilled in the art and are available from a wide variety of commercial sources, and many are found in currently available glass ionomer cements such as those commercially available under the trade designations Ketac™-Molar or Ketac™-Fil Plus (3M Oral Care), and FUJI™ IX (GC).

Fluoro aluminosilicate glasses can be prepared by fusing mixtures of silica, alumina, cryolite and fluorite.

Metal oxide or hydroxide powder which can be used include the oxides or hydroxides of Al, Si, Zr, Ba, Sr, Ca, Mg, Ag, Zn and mixtures thereof.

Using metal oxide powders can be beneficial, if the surface of the 3-dimensional article should become more hydrophilic. If desired, the particles can be surface treated, e.g. silanized.

To improve the processing and transporting of the particles in a sandblasting or powder jetting device, the addition of free-flow or anti-caking agents can be advantageous.

Suitable free-flow or anti-caking agents include silica powder (e.g. Aerosil™ from Evonik, including OX 50, 130, 150 and 200: HDK™ from Wacker, including H15, H20, H200), silicate powder, or talcum powder and mixtures thereof.

These free-flow or anti-caking agents typically have an average particle size in the range of 10 to 500 nm or 10 to 200 nm.

If a free-flow or anti-caking agent is used, the treatment step is done with a mixture of particles, i.e, a particle composition comprising large and small particles.

A suitable particle composition may comprise particles with an average particle size of 1 to 150 µm, and particles with an average particle size of 10 to 500 nm.

If a free-flow or anti-caking agent is used, it is typically present in the particle composition in an amount of 0.05 to 5 wt. % or 0.1 to 3 wt. % with respect to the amount of the particle composition.

The inventive process further comprises an additional curing step to the 3-dimensional article. This additional curing step can be performed either by heat or radiation or a combination of both.

By applying the additional curing step, the remaining radiation-curable composition located on the surface of the 3-dimensional article is cured. By doing this, the particle which have been embedded into the layer of the radiation-curable composition are fixed and are firmly connected to the 3-dimensional article.

The post-curing step can be characterized by at least one, or all of the following features:
applying radiation with wavelength of 350 to 450 nm;
applying a heating step of 30 to 120° C. or from 40 to 80° C.

Devices which can be used for post-curing a 3-dimensional article obtained by additive-manufacturing are commercially available, e.g. from Rapidshape, 3Shape, EnvisonTEC, Formlabs and others.

The process described in the present text is for producing a surface-modified 3-dimensional article, in particular a 3d-printed article.

The invention is also directed to a 3-dimensional article which is obtainable or can be obtained by such a process.

If desired, the 3-dimensional article can be characterized by the following features alone or in combination:
flexural strength: 50 to 200 MPa or 80 to 150 MPa determined according to ISO 4049:2009 using a test bar having the dimensions 6*4*25 mm, while 6 mm is the width of the test bar;
E-modulus 1,000 to 4,000 MPa determined according DIN EN 843-2:2007 using the flexural strength method, while calculation of the modulus is done in the range of 20% and 50% of maximum force of the samples;
impact strength: 5 to 15 KJ/m² determined according to DIN 53453:175-05.

A sufficient flexural strength can be beneficial because the material of the 3-dimensional article will not break easily.

A sufficient low E-modulus can be beneficial because the material of the 3-dimensional article has a sufficient flexibility.

A sufficient impact strength can be beneficial because the material of the 3-dimensional article has a high toughness and can resist to fracture The shape and dimension of the 3-dimensional article is not particularly limited.

Depending on the size and dimension of the additive-manufacturing used, the size and dimension of the 3-dimensional article may vary, too.

The process described in the present text can be used for producing all kinds of 3-dimensional articles the surface of which should be modified by embedding or fixing particles to its surface.

As this process is based on using an additive-manufacturing technique, the process is in particular useful for 3-dimensional article having complex dimension, which cannot be easily produced otherwise, e.g. by moulding or milling processes.

The x, y, z dimensions of the 3-dimensional article are typically less than 100 mm for each dimension, e.g. within a range of 1 to 50 mm or 2 to 30 mm for two dimensions.

The process described in the present text is in particular useful in the dental and orthodontic field, as dental and orthodontic articles typically have complex structures, which may require certain surface treatments and the fixing of the dental or orthodontic article to a tooth surface.

As an example, the process described in the present text can be used for producing dental restorations, in particular dental restorations having the shape of a dental crown or bridge.

Dental or orthodontic article can often be characterized by having an outer and an inner surface. The outer surface is the surface which will remain visible after the dental article has been fixed to a tooth structure, whereas the inner surface is the surface which is intended to be fixed to a tooth structure.

In one embodiment, the 3-dimensional article has the shape of a dental restoration with an outer and an inner surface, wherein only the inner surface of the 3-dimensional article comprises particles, which are partially embedded therein.

The 3-dimensional article is typically composed of a composition comprising cured (meth)acrylate components and fillers, wherein the maximum particle size of the fillers is typically below 1 µm.

The 3-dimensional article comprises on its inner surface a section or layer of cured radiation-curable components comprising in addition particles having an average particle size which is greater than 1 µm, e.g. in a range of 2 to 100 µm.

As mentioned above, the thickness of the layer of cured radiation-curable components can be in the range of 1 to 500 µm or 5 to 200 µm or 10 to 100 µm.

Such a 3-dimensional article can also be produced by
providing a 3-dimensional article (e.g. a dental or orthodontic article with an outer and inner surface),
applying a layer of a radiation-curable composition on the inner surface of the 3-dimensional article,
treating at least a portion of the surface of the 3-dimensional article to which the radiation-curable composition is stuck with particles,
applying a curing step of the 3-dimensional article, preferably by applying heat and/or radiation, wherein the respective components or particles are as described in the present text.

According to a preferred embodiment, the dental article has the shape of a dental composite crown.

The shape of a dental composite crown is typically characterized as follows:

The crown has a top surface and depending buccal, respectively labial, mesial, distal, lingual, respectively palatinal side surfaces.

The side surfaces are connected to each other and form a crown cervix. The lower region of the crown cervix forms the crown margin or crown rim.

The dental composite crown has an outer and an inner surface. The inner surface is the surface to be attached to a prepared dental tooth.

The wall thickness of the crown at the crown cervix (in a distance of 1 mm from the crown margin) is equal to or lower than 0.8 or equal to or lower than 0.7 or equal to or lower than 0.6 mm or in a range of 0.1 to 0.8 mm or 0.1 to 0.7 mm or 0.1 to 0.6 mm or 0.1 to 0.5 mm.

The wall thickness of the top surface (occlusal and/or distal) of the preformed crown is typically in the range of 0.15 mm to 1.5 mm or in the range of 0.4 mm to 1.0 mm.

At least two of the opposing and depending side surfaces of the dental composite crown may have a concave shape, preferably the buccal and lingual side surfaces. That is, the side walls of the crown have a curved shape and thus may provide an undercut in the region of the crown cervix.

The wall thickness of the side surfaces of the crown is typically not larger than 0.7 mm or 0.6 mm or 0.5 mm or 0.4 mm.

According to one embodiment, the wall thickness of the side surfaces of the preformed crown is in a range of 0.1 mm to 0.7 mm. According to another embodiment, the wall thickness of the side surfaces of the preformed crown is in a range of 0.1 mm to 0.6 mm. According to another embodiment, the wall thickness of the side surfaces of the preformed crown is in a range of 0.1 mm to 0.5 mm. According to a further embodiment, the wall thickness of the side surfaces of the preformed crown is in a range of 0.1 mm to 0.4 mm.

The invention is also directed to the 3-dimensional article described in the present text for use in a method of restoring or treating a tooth, preferably in the mouth of a patient.

This method comprises the steps of providing the 3-dimensional article e.g. having the shape of a dental restoration (in particular the shape of a dental crown or bridge) as described in the present text and fixing the 3-dimensional article to the surface of the tooth to be treated or restored by using a dental cement.

The surface of a 3-dimensional article which is mainly composed of cured (meth)acrylate components and fillers and is typically rather hydrophobic.

Dental articles having the shape of a crown comprising cured (meth)acrylate components and fillers are often called "dental composite crown".

The fixation of 3-dimensional articles with a hydrophobic surface to a rather hydrophilic surface (e.g. surface of hard dental tissue) is not trivial.

The fixation of a dental composite crown typically requires additional steps, e.g. a surface roughening of the tooth and/or the inner surface of the dental composite crown to provide retention elements for the dental cement Alternatively, or in addition a so-called self-etching dental adhesive is used, which contains components, which on the one hand can interact with the surface of the composite crown and on the other hand with the surface of the tooth.

Using the 3-dimensional article described in the present text, the fixation process can be simplified as the surface of the 3-dimensional article has particles embedded therein, which facilitate the fixation process.

The particles may either act as retention element and/or chemically interact with reactive components being present in the dental cement.

Generally, for the fixing of dental crowns and bridges different cementation techniques are available.

These can be divided into clusters like temporary cementation (e.g. RelyX™ TempNE/E, 3M Oral Care), conventional cementation (e.g. Ketac™ CEM or Ketac™ CEM Plus, 3M Oral Care), self-adhesive resin cementation (e.g. RelyX™ Unicem, 3M Oral Care) or adhesive resin cementation (e.g. RelyX™ Ultimate, 3M Oral Care).

In general, the cementation should be durable over the lifetime of the indication, which could be achieved either due to chemical bonding or mechanical retention or a combination thereof.

The choice of the used cement or the general cementation technique for a specific indication is therefore influenced by the material of the restoration, the indication itself, the preparation technique, but also cost and esthetic plays a role.

For a fast and easy chairside workflow with preformed crowns, e.g. pediatric dentistry a fast and easy cementation technique is desired. In this respect different kinds of dental cements can be used.

Suitable dental cements include glass ionomer cements (GIZ), resin-modified glass ionomer cements (RM-GIZ), adhesive resin cements, self-adhesive resin cements and temporary cements.

Glass ionomer cements are typically provided as a kit of part comprising a liquid part and a powder part. The two parts have to be mixed before use.

The powder part typically comprises an acid-reactive inorganic filler (e.g. a fluoro alumosilicate glass, FAS glass).

The liquid part typically comprises a polyacid, water and a complexing agent (e.g. tartaric acid).

Glass ionomer cements are commercially available (e.g. Ketac™ Cem; 3M Oral Care).

The glass ionomer cement can also be provided as a kit of parts comprising two pastes A and B to be mixed before use.

Resin-modified glass ionomer cements typically contain the following components: acid-reactive filler, polyacid, water, complexing agent, radiation curable components, initiator.

Suitable radiation curable components typically contain (meth)acrylate moieties.

Resin-modified glass ionomer cements are provided as kit of parts as well, either as powder/liquid system or paste/paste system.

The powder part typically comprises acid-reactive inorganic filler(s) (e.g. a fluoro alumosilicate glass, FAS glass) and initiator components.

The liquid part typically comprises polyacid, water, (meth)acrylates and initiator components.

Resin-modified glass ionomer cements are commercially available (e.g. Ketac™ Cem Plus: 3M Oral Care).

(Self) adhesive resin cements typically contain the following components: acidic (meth)acrylate monomers, non-acidic (meth)acrylate monomers, fillers (including acid-reactive fillers), initiator(s), stabilizer(s), solvent(s).

Adhesive resin cements are also commercially available (e.g. RelyX™ Ultimate Adhesive Resin Cement: 3M Oral Care).

The invention is also directed to a kit of parts comprising as individual parts
at least one 3-dimensional article as described in the present text, in particular a 3-dimensional article having the shape of a dental restoration (e.g. dental crown or dental bridge) and
a dental cement, in particular a glass ionomer cement or resin-modified glass ionomer cement.

Such a kit is in particular useful in a method for restoring or treating a tooth.

The invention is also directed to a kit of parts or system for producing a surface-modified 3-dimensional article as described in the present text, the kit of parts or system comprising as individual parts
a radiation-curable composition as described in the present text,
particles for treating the surface of a 3-dimensional article as described in the present text,
an additive-manufacturing equipment for processing the radiation-curable composition as described in the present text to obtain a 3-dimensional article.

Useful additive-manufacturing equipment includes a 3d-printing device (in particular an SLA or DLP printer), a building platform, a bottle or cartridge for storing and/or delivering the radiation-curable composition, and an instruction for use describing the process steps outlined in the present text.

Further illustrative embodiments of the invention are given below:

Embodiment 1

A 3-dimensional article having the shape of a dental restoration (e.g. crown or bridge) for use in a method of restoring or treating a tooth in the mouth of a patient,
the 3-dimensional article having an outer and an inner surface, wherein the inner surface comprises partially embedded particles,
the partially embedded particles having an average particle size in the range of 1 to 100 μm, and
being selected from or comprising glass particles, metal oxide or hydroxide particles or a combination of both,
the method comprising the steps of
providing the 3-dimensional article,
fixing the 3-dimensional article to the surface of the tooth by using a dental cement,
the dental cement being selected from or comprising a glass ionomer cement, a resin cement, an adhesive cement, a self-adhesive cement, a resin-modified glass ionomer cement or a temporary cement.

Embodiment 2

A process comprising the steps of
a) providing a radiation-curable composition,
b) building-up a 3-dimensional article by radiation-curing the radiation-curable composition layer by layer, preferably by using stereolithography or digital light processing,
c) partially removing radiation-curable composition which sticks to the surface of the 3-dimensional article,
d) treating at least a portion of the surface of the 3-dimensional article to which radiation-curable composition is stuck with particles,
e) applying an additional curing step to the 3-dimensional article, preferably by applying heat and/or radiation:
the radiation-curable composition
comprising (meth)acrylate component(s), photo-initiator(s), filler(s) and optionally dye(s), wherein the filler(s) do not contain particles with a size above 5 μm, and
having a viscosity in the range of 1 to 100 Pa*s at 23° C., the particles used for the treating step
having an average particle size in the range of 1 to 100 µm, and
being selected from glass powder, metal oxide or hydroxide powder and mixtures thereof,
the x, y, z dimensions of the 3-dimensional article being less than 100 mm for each dimension.

FIG. 1 shows a schematic view of the process described in the present text resulting in a surface-modified 3d-printed 3-dimensional article.

In Section 1 a surface is shown composed of two regions, a light-grey region and a dark-grey region.

The light-grey region represents a surface portion of a fully cured composition (e.g. comprising cured (meth)acrylate components). The fully cured composition may be part of a dental composite crown.

The dark-grey region represents a surface portion of a radiation-curable composition (e.g. comprising (meth)acrylate components), which is not cured yet and sticks to the surface of the fully cured composition.

Particles shown on the left side of Section 1 are applied to the dark-light region (e.g. by using a gas stream or by dropping the particles on the surface).

In Section 2, the particles are partially embedded in the radiation-curable composition (dark-grey region).

Section 3 shows the surface region after a curing step has been applied, with partially embedded particles. The previous dark-grey region became light-grey.

The radiation-curable composition intended to be used for producing dental or orthodontic articles should not contain components, which are detrimental to a patient's health.

The radiation-curable composition does typically not include components which may dissolve the particles applied to the surface of the 3-dimensional article, such as strong acids (e.g. hydrochloric acid, sulfuric acid, phosphoric acid).

Further, the radiation-curable composition does typically not include an epoxy-resin.

The components used for producing the curable composition and in particular the dental articles described in the present text should be sufficiently biocompatible, that is, the composition should not produce a toxic, injurious, or immunological response in living tissue.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate the invention.

Examples

Unless otherwise indicated, all parts and percentages are on a weight basis, all water is de-ionized water, and all molecular weights are weight average molecular weight. Moreover, unless otherwise indicated all experiments were conducted at ambient conditions (23° C.: 1013 mbar).

Methods

Viscosity

If desired, viscosity can be measured using a Physica MCR 301 Rheometer (Anton Paar, Graz, Austria) with a plate/plate geometry under controlled shear rate at 23° C. The diameter is 15 mm, the separation gap between the plates 0.5 mm. The shear rate is ramped from 1,000 s$^{-1}$ to 0.001 s$^{-1}$.

Particle Size (Suitable for Micro-Sized Particles)

If desired, the particle size distribution including the average particle size can be determined with a Cilas 1064 (FA. Quantacrome) particle size detection device. During the measurement, ultrasonic is typically used to accurately disperse the sample.

Particle Size (Suitable for Nano-Sized Particles)

If desired, particle size measurements can made using a light scattering particle sizer equipped with a red laser having a 633 nm wavelength of light (obtained under the trade designation "ZETA SIZER-Nano Series, Model ZEN3600" from Malvern Instruments Inc., Westborough, MA). Each sample is analyzed in a one-centimeter square polystyrene sample cuvette. The sample is diluted 1:100, e.g. 1 g of sample is given to 100 g of de-ionized water and mixed. The sample cuvette is filled with about 1 gram of diluted sample. The sample cuvette is then placed in the instrument and equilibrated at 25° C. The instrument parameters are set as follows: dispersant refractive index 1.330, dispersant viscosity 0.8872 mPa*s, material refractive index 1.43, and material absorption value 0.00 units. The automatic size-measurement procedure is then run. The instrument automatically adjusts the laser-beam position and attenuator setting to obtain the best measurement of particle size.

The light scattering particle-sizer illuminates the sample with a laser and analyzes the intensity fluctuations of the light scattered from the particles at an angle of 173 degrees. The method of Photon Correlation Spectroscopy (PCS) can be used by the instrument to calculate the particle size. PCS uses the fluctuating light intensity to measure Brownian motion of the particles in the liquid. The particle size is then calculated to be the diameter of sphere that moves at the measured speed.

The intensity of the light scattered by the particle is proportional to the sixth power of the particle diameter. The Z-average size or cumulant mean is a mean calculated from the intensity distribution and the calculation is based on assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones.

The Volume Distribution gives the percentage of the total volume of particles corresponding to particles in a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average will typically be a smaller value than the Z-average size. In the scope of this document the Z-average size is referred to as "mean particle size".

pH Value

If desired, the pH value of can be determined as follows: 1.0 g of a component (e.g. filler) is dispersed in 10 ml de-ionized water and stirred for about 5 min. A calibrated pH electrode is dipped into the suspension and the pH value is determined during stirring.

Elemental Composition

If desired, the elemental composition can be determined by X-ray fluorescence spectrometry (XRF). e.g. with the ZSX Primus II from Rigaku, Japan. This method is especially suited for the analysis of solids, e.g. zirconia ceramics or glass materials.

Flexural Strength (FS)

If desired, flexural strength can be determined by conducting a three point flexural strength test according to ISO 4049:2019 using test specimen having the size 4*6*25 mm. Flexural strength is given in [MPa].

E-Modulus (EM)

If desired, the E-Modulus can be determined according to DIN EN 843-2:2007 using a test bar having the dimensions 6*4*25 mm, with 6 mm being the width of the sample. The E-Modulus is determined between the range of 20% and 50% of the maximum force of the test specimen. E-Modulus is given in [GPa].

Impact Strength (IS)

If desired, the impact strength can be determined according to DIN 53453:1975-05 (Charpy) using test samples having the dimensions 4*6*50 mm, using a Zwick 5102 pendulum set up with a 0.5 J pendulum and using a span of 42 mm. Impact strength is given in [kJ/m$^2$].

Shear Bond Strength (SBS)

The Surface of a stainless-steel cylinder with a diameter of 4 mm and a height of 2 mm were roughened (Rocatec™ Plus, 3M Deutschland GmbH) and silan treated (3M ESPE Sil™, 3M Oral Care). The cylinders were cemented on the substrates using a RMGI cement (RelyX™ luting plus cement, 3M Deutschland GmbH). Therefore, the cement was applied between substrate and cylinder. The cylinder was loaded with 240 g, cement excess was removed and loading kept constant for overall 10 min under 36° C., temperature. Loading was removed and materials were stored for 2 2h at 36° C., and 100% rel. humidity. The SBS is given In MPa.

For shear bond strength, the substrate was placed in a shear device and stainless-steel cylinder was sheared off with a cross head speed of 0.75 mm/min. The resulting adhesion in MPa is calculated by shearing force [N] divided by surface of the cylinder base surface [mm2]. For each group, n=6 samples were tested.

Surface Roughness (Ra)

Surface roughness Ra was determined with a profilometer Mahr S2 (Mahr GmbH) according EN ISO 4287:2010-07 and EN ISO 4288:1998-04. The surface roughness is given in µm.

Materials

TABLE 1

| | | |
|---|---|---|
| Al-Ox 1 | Rocatec ™ Pre (3M Oral Care), Al$_2$O$_3$; average particle size: 110 µm (according to data provided by manufacturer) | sandblasting medium |
| Al-Ox 2 | Korox ™ 50 (Bego), Al$_2$O$_3$; average particle size: 50 µm (according to data provided by manufacturer) | sandblasting medium |
| Glass ionomer powder (GIP) | Calcium fluoro aluminium silicate glass as described in EP 0 115 058 A2, ground and sieved, particle size: sieve fraction: 90 µm-200 µm. | sandblasting medium |
| Zr/Si Nanocluster | as described in U.S. Pat. No. 6,730,156 B1, column 25, Preparatory Example A; the obtained filler particles were surface treated according to Preparatory Example B of U.S. Pat. No. 6,730,156 B1. | filler |
| HDK ™ H-2000 | fumed silica filler; surface modification: —OSi(CH$_3$)$_3$; agglomerated nanoparticles | filler |
| SG-YBF100 | ytterbium fluoride powder | filler |
| D-Zethacrylate | ethoxylated Bisphenol A dimethacrylate; | reactive matrix |
| DESMA | urethane(meth)acrylate; as described in Example 1 of EP 2 167 013 B1 (page 20) | polymerizable methacrylate |
| Ionol ™ | 2,6-ditert.butyl-4-methylphenol; stabilizer | stabilizer |
| Lucirin ™ TPO | Photo-initiator | initiator |
| Lumilux ™ Blau LZ | Organic dye | Absorber |
| Cement | RelyX ™ Luting plus (3M Oral Care) | dental cement |

The composition outlined in Table 2 was prepared. The amount of the components is given in parts by weight (pbw) in suitable ranges:

TABLE 2

| | Inventive Example |
|---|---|
| Lucirin TPO | 0.7-0.9 |
| Lumilux Blau LZ | 0.001-0.005 |
| Ionol | 0.02-0.05 |
| D-Zethacrylat | 50.00-60.00 |
| DESMA | 5.00-15.00 |
| HDK H-2000 | 2.00-3.00 |
| SG-YBF 100 | 0.0-3.00 |
| Zr/Si-Nanocluster | 26.00-31.00 |
| Pigments to adjust tooth colours | 0.0-0.5 |

The components were provided and mixed using a kneader to obtain a homogenous paste.

Additive Manufacturing Process:

The paste was poured into the working tray of a commercially available DLP printer (Rapidshape, Heimsheim, Germany).

The pre-processing data (STL-file; shape of 3-dimensional cuboid object; 25 mm×10 mm×5 mm) was loaded into the printer.

The following printing conditions can be applied: curing light wavelength: 383-460 nm light; curing light intensity: 50-200 W/m$^2$; exposure time: 1-11 sec; layer thickness: 50 µm.

3-Dimensional Article

The 3-dimensional article to be surface treated was produced as follows: A composition as described in the Inventive Example was prepared. This composition was placed in a vat of an additive-manufacturing device. By using the parameters described above in the additive manufacturing process a 3-dimensional article was produced layer-by-layer. The 3-dimensional article had the shape of a cuboid (dimensions: 25 mm×10 mm×5 mm). The 3-dimensional article was removed from the vat of the additive-manufacturing device.

Cleaning Process:

The cleaning of the 3-dimensional article from excess material was performed as described in WO 2019/023120 A1 (3M) using the parameters described in the text above.

Light Curing Step

For the final curing of the 3-dimensional article a light curing device was used that is able to emit light between 383 nm and 46 0nn at 50-500 mW/cm².

Light curing to full cure of the samples was conducted under reduced pressure (in the range of 1-100 mbar).

Process for Surface Modification

For the sandblasting of the surface of the 3-dimensional article the following process parameters were used:

Process Parameters:

Device: Renfert Basic Quattro; pressure: 2.0-4.0 bar

Sandblasting Process 1:

Cuboid Specimens printed and cleaned as described are sandblasted using the above-mentioned parameters before the final Light Curing Step is conducted.

Sandblasting Process 2;

Cuboid Specimens printed and cleaned as described are sandblasted using the above-mentioned parameters after the final Light Curing Step is conducted.

|  | Inventive Example 1 | Inventive Example 2 | Inventive Example 3 | Comparative Example A | Comparative Example B |
|---|---|---|---|---|---|
| Sandblasting Material | Al-Ox 2 | Al-Ox 1 | GIP | Al-Ox 2 | Al-Ox 1 |
| Sandblasting Process | 1 | 1 | 1 | 2 | 2 |
| Surface roughness [μm] | 7.8 | 13.7 | 17.4 | 0.5 | 3.2 |
| Shear Bond Strength [MPa] | 5.6 | 11.9 | 10.9 | 2.4 | 1.6 |

The invention claimed is:

1. A process of producing a surface-modified 3-dimensional article, the surface-modified 3-dimensional article having the shape of a dental or orthodontic article, the process comprising the steps of:
    providing a radiation-curable composition, the radiation curable composition comprising (meth)acrylate components, photo-initiator, optionally dye(s) and optionally filler(s),
    building-up a 3-dimensional article by radiation-curing the radiation-curable composition layer by layer using a stereolithography or digital light processing unit,
    partially removing radiation-curable composition which sticks to the surface of the 3-dimensional article, the remaining radiation-curable composition forming a layer on the surface of the 3-dimensional article,
    treating only a portion of the surface of the 3-dimensional article to which the radiation-curable composition is stuck with particles in a manner enabling at least a portion of the particles to become partially embedded in the radiation-curable composition which remained on the surface of the 3-dimensional article, and
    applying an additional curing step to the 3-dimensional article by applying heat or radiation to at least the treated portion of the surface of the 3-dimensional article,
    the treating step being adjusted to achieve a surface roughness Ra of 1 to 20 μm.

2. The process according to the claim 1, the thickness of the layer formed by the remaining radiation-curable composition being in a range of 1 to 500 μm.

3. The process according to claim 1, the additional curing step being characterized by the following features alone or in combination:
    applying radiation with a wavelength of 350 to 450 nm, or
    applying a heating step of 30 to 120° C.

4. The process according to claim 1, the particles being characterized by the following features alone or in combination:
    average particle size: 1 to 150 μm; or
    density: 2 to 6 g/cm³.

5. The process according to claim 1, the material of the particles being selected from glass powder, metal oxide or hydroxide powder, and mixtures thereof.

6. The process according to claim 1, the radiation-curable composition being characterized by the following feature:
    viscosity: 1 to 400 Pas at 23° C., and a shear rate of 1 s⁻¹.

7. The process according to claim 1, the treating step comprising the following steps alone or in combination:
    applying the particles with a gas stream with a working pressure in the range of 0.5 to 500 kPa or with a particle flow rate in the range of 0.01 to 10 g/s; or
    applying the particles by coating.

8. The process according to claim 1, the partially removing of the radiation-curable composition being done by applying either of the following process steps alone or in combination:
    rotating the 3-dimensional article to generate a mass inertial force;
    using a cleaning composition;
    storing the 3-dimensional article for a time sufficient to allow the radiation-curable composition to drop or flow from the surface of the 3-dimensional article; or
    applying a gas stream.

9. The process according to claim 1, the process being characterized as follows:
    the radiation-curable composition comprising (meth)acrylate component(s), photo-initiator(s), filler(s) and optionally dye(s), wherein the filler(s) do not contain particles with a size above 1 μm, and having a viscosity in the range of 5 to 100 Pa*s at 23° C., and a shear rate of 1 s⁻¹, and
    the particles used for the treating step having an average particle size in the range of 1 to 150 μm, and being selected from glass powder, metal oxide powder, hydroxide powder and mixtures thereof,
    the x, y, z dimensions of the 3-dimensional article being in a range of 1 to 100 mm for each dimension.

10. A 3-dimensional article obtained or obtainable by the process described in claim 1.

11. The process according to claim 1, wherein the 3-dimensional article is subjected to a post-curing step under reduced pressure in the range of 1 to 100 mbar.

\* \* \* \* \*